2,841,181

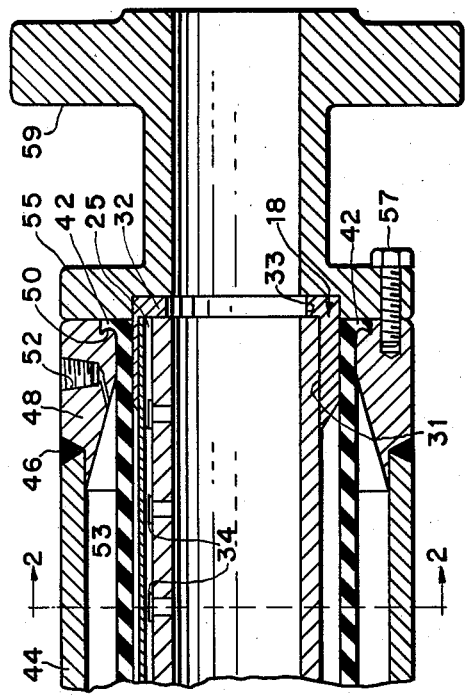
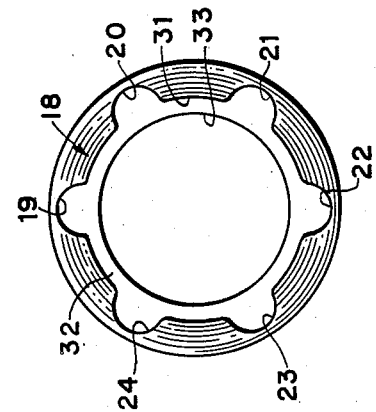
Fig.3
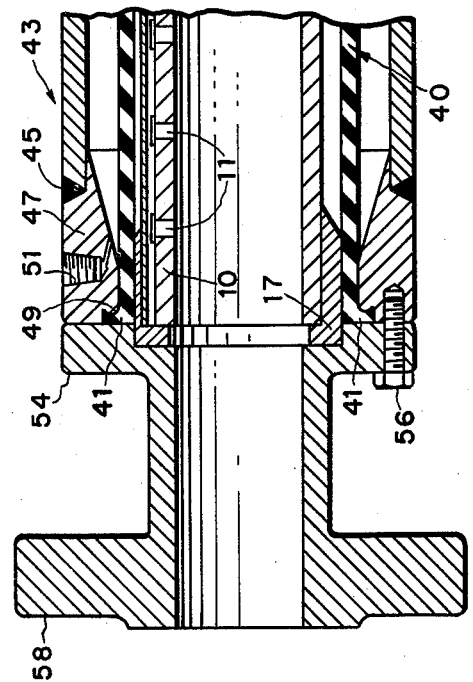
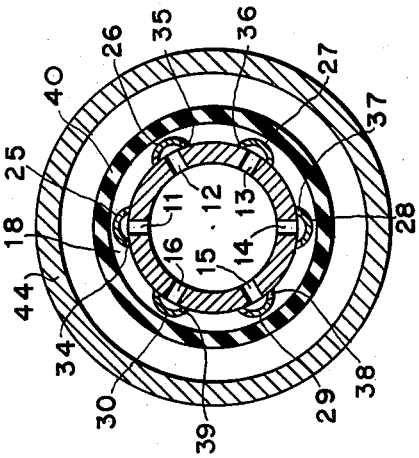
Fig.1
Fig.2
INVENTORS
Ellis E. Hewitt and
Ralph R. Leffler.
BY
Attorney United States Patent Office 2,841,181
Patented July 1, 1958

PULSATION DAMPENER DEVICE

Ellis E. Hewitt, Ruffsdale, and Ralph R. Leffler, Trafford, Pa., assignors to Westinghouse Air Brake Company, Wilmerding, Pa., a corporation of Pennsylvania Application January 31, 1956, Serial No. 562,386

4 Claims. (Cl. 138—30)

This invention relates to devices for dampening, absorbing, and suppressing undesired pulsations or surges in fluid systems, and more particularly to such devices of the type employing a mandrel and resilient means associated therewith and adapted to be connected in circuit with conduits or pipe lines carrying fluid subject to such pulsations or surges.

As is well known in the art to which the invention relates, pulsations and surges which the apparatus of the instant invention is designed to dampen and suppress originate in fluid systems in a number of ways. Reciprocating pumps have an output which is usually characterized by low cycle or low frequency surges of high volume or intensity. Centrifugal and rotary pumps may have in their fluid output low volume surges occurring at a high frequency, and in addition to these periodic surges shock waves may be generated in any fluid flow system where the fluid is subject to sudden deceleration, such for example as that caused by closing a valve against a moving column of fluid. The closing of such a valve may result in the generation of surges or shock waves of high intensity which may result in damaged pipe lines and in undesirable noises commonly known as "water hammer."

It is old in the art to suppress and dampen these surges and shock waves by connecting in the fluid line a mandrel or section of pipe having therein a number of perforations or throttling orifices, this perforated pipe section or mandrel being surrounded by a resilient sleeve of rubber or other suitable material. Sudden increases of pressure in the fluid in the line cause the fluid to flow through the perforations into the space between the sleeve and the mandrel, thereby taking up or absorbing the excess pressure. When the pressure in the line returns to normal, the fluid between the sleeve and the mandrel is discharged through the openings or perforations back into the line. In some prior art devices the sleeve itself has pressure applied to the outside thereof by suitable means, such for example as compressed air, to insure the rapid collapse of the sleeve and return to its former position and discharge of fluid back into the line when the line pressure falls to normal or below after the surge has passed.

It has been found that the useful life of resilient sleeves in such devices is limited by the wear resulting from contact and friction between the sleeve and pipe section or mandrel, particularly when the sleeve collapses against the perforated pipe, and also to some extent when the sleeve is distended by surges of pressure in the line and may make contact with the walls of a surrounding housing.

Furthermore, the sleeve may be stretched beyond its limit of elasticity by the fluid intake during the surge so that the sleeve does not return to normal or its former position when the pressure decreases, with the result that undesired stresses and strains may occur in the material of the sleeve resulting in its ultimate rupture and possibly reducing its effectiveness as a surge absorbing element. Also, sharp folds in the sleeve may occur when it collapses after the surge has passed, the sharp folds resulting in ruptures.

The apparatus of the subject invention is adapted to reduce to a minimum wear or damage to the resilient sleeve of both the before-named varieties. It accomplishes this object by providing a mandrel which includes a perforated section having a plurality of rows of throttling orifices circumferentially spaced and running the length of the section. Over these rows of throttling orifices are placed hollow, substantially semi-circular rods which have a number of lateral slots therein. The rods are held in their proper positions on the mandrel or perforated pipe section by cups or caps which fit over the ends of the pipe section and which have curved apertures therein for receiving the ends of the rods. Fluid flows through the orifices in the mandrel or pipe section, thence out of the slots. It may also flow through the interior of the rods. The resilient sleeve surrounds the rods and is normally supported adjacent or near the rods. When the sleeve collapses during rarefactions in the pressure of the fluid, the rods control and define the collapse of the sleeve and prevent the sleeve from making contact with the orifices in the pipe or mandrel, thereby preventing the sleeve from being firmly compressed against these orifices and being cut or damaged by the edges thereof. Furthermore, because the sleeve is spaced from the pipe section by the rods, when it collapses it does so along the curved surfaces of the rods without sharp folds occurring in the material of which the sleeve is made. Also, large changes in the volume between the inside of the sleeve and the outer surface of the mandrel may occur without substantial expansion and contraction of the resilient sleeve itself.

Accordingly, it is a primary object of this invention to provide new and improved surge absorbing and pulsation dampening apparatus characterized by long and trouble-free life.

Another object is to provide surge absorbing and pulsation dampening apparatus characterized by substantially constant high efficiency over its entire lifetime.

Another object is to provide new and improved surge absorbing apparatus of the type employing a resilient sleeve in which wear of the sleeve is reduced to a minimum.

Another object is to provide new and improved surge absorbing apparatus of the type employing a resilient sleeve supported by a mandrel in which frictional contact between the sleeve and mandrel is reduced to a minimum.

Still another object is to provide new and improved surge absorbing apparatus of the type employing a resilient sleeve supported by a mandrel in which the volume between the sleeve and mandrel may vary within useful limits without excessive expansion and contraction of the sleeve.

A further object is to provide a new and improved mandrel for use in surge absorbing apparatus of the type employing a resilient sleeve supported by a mandrel.

Still a further object is to provide a new and improved mandrel for use in surge absorbing and pulsation dampening apparatus of the type employing a resilient sleeve supported by a mandrel in which the mandrel is so shaped as to reduce frictional contact with the sleeve to a minimum.

Other objects and advantages will become apparent after a perusal of the following specification when studied in connection with the accompanying drawings in which:

Fig. 1 is a broken cross-sectional view of the pulsation dampener apparatus along two planes intercepting at the longitudinal axis thereof;

Fig. 2 is a cross-sectional view taken along the line 2—2 of Fig. 1; and

Fig. 3 is a plan view of a metallic cup member employed in the invention.

Referring now to the drawings for a more detailed understanding of the invention, and in which like reference characters are used throughout to designate like parts, there is shown in Fig. 1 a perforated pipe section designated by the reference numeral 10 and having circumferentially spaced rows of throttling orifices 11, 12, 13, 14, 15 and 16 therein (Fig. 2). Whereas six rows of perforations or throttling orifices are shown, it is to be understood that the invention is not limited to this number of rows and that any convenient number could be employed. It is further to be understood that the invention is not limited to any particular size of the throttling orifices and slots hereinafter to be described, shapes, or areas thereof, or to any relationship between the size or area of the slots and orifices and the diameter or area of the pipe section 10.

Disposed around the ends respectively of the pipe section 10 are two cup members 17 and 18, a plan view of cup member 18 being shown in Fig. 3. The member 18 has circumferentially spaced therein six substantially semi-circular apertures 19, 20, 21, 22, 23 and 24 for, while the cup member is mounted on the perforated pipe section, receiving the adjacent ends respectively of six rod members designated by the reference numerals 25, 26, 27, 28, 29 and 30. The rods are preferably hollow and are preferably substantially semi-circular in cross-section. The cup member generally designated 18 has a bore or aperture 31 therein for receiving the adjacent end of the perforated pipe section 10, and it has a lip portion 32 which abuts against the end of the pipe section 10 for holding the cup in place thereon and for other reasons hereinafter to be apparent. The diameter of the opening 33 in the cup is preferably at least as great as the inside diameter of perforated pipe section 10, to avoid obstructing the passage through pipe section 10. The cup member 17 is similar to the cup member 18. Both cup members have means associated therewith for maintaining them in a predetermined angular setting on the end of the pipe section 10, for example a pin and slot (not shown).

The aforementioned rod members 25, 26, 27, 28, 29 and 30 are held in place by the cup members 17 and 18 over the rows of throttling orifices 11, 12, 13, 14, 15 and 16 respectively as shown in Fig. 2. Each of the rods has a series of slots spaced along the underside thereof similar to the slots 34 in rod 25 of Fig. 1, the slots in rods 26, 27, 28, 29 and 30 being designated 35, 36, 37, 38 and 39 respectively, Fig. 2. It should be noted that the rods 25, 26, 27, 28, 29 and 30 are all in the form of half sections of pipe, that the rods are hollow and fluid from a given orifice 11, Fig. 1, may flow either to the right or left inside the rod as well as out of the adjacent slot 34.

Disposed around the perforated pipe section 10 and supported by the cups 17 and 18 and to some extent by the rounded tops of the rods or pipes 25, 26, 27, 28, 29 and 30, is a resilient sleeve member generally designated by the reference numeral 40, the sleeve 40 having two flanged end portions 41 and 42 as shown.

Disposed around the resilient sleeve 40 is a housing generally designated by the reference numeral 43, the housing 43 comprising a cylindrical portion 44 welded at 45 and 46 to end rings 47 and 48, the end rings 47 and 48 having inward extending annular lips 49 and 50 for making pressurized sealed contact with the aforementioned flanged ends 41 and 42 of the resilient sleeve 40.

Disposed in the end rings 47 and 48 are threaded bores 51 and 52 respectively, one of these bores being connected to a pressure gauge (not shown), the other bore being connected by way of a valve and pipe (not shown) to a source of fluid under pressure (not shown), for example, compressed air, for introducing fluid under pressure into the annular chamber 53 formed between the housing 43 and the sleeve 40.

Mounted adjacent the end rings 47 and 48 are two coupling members 54 and 55 respectively which are secured to the end rings 47 and 48 by bolts 56 and 57 respectively. It is to be understood that the flanges 58 and 59 of the coupling members 54 and 55 respectively are adapted to be connected to the remainder of the pipe line carrying the fluid from which surges are to be removed.

Whereas for convenience of illustration only the embodiment of the invention is shown in which fluid flows through the dampening device, it is to be understood that one end of the device could be closed as by a cap or other convenient means (not shown), and the other end of the dampener device connected to the fluid line as by a T-joint.

Whereas for convenience of illustration an embodiment of the invention has been shown in which the number of slots in the rods corresponds to the number of orifices in the rows of the perforated pipe section, it is to be understood that any convenient number of transverse slots could be employed.

Having now described the invention, what we claim as new and desire to secure by Letters Patent, is:

1. Pulsation dampening apparatus for use with a pipe line carrying a fluid under variable pressure, comprising, in combination, a pipe section for connecting to said line, said section being perforated with a plurality of throttling orifices extending in a plurality of rows substantially parallel to the longitudinal axis of the pipe section, a plurality of slotted substantially semi-circular rods disposed on the outside of said pipe section in positions over said plurality of rows, respectively, the slots communicating with said orifices, cup means mounted on the ends of said pipe section, said cup means being constructed and arranged to cooperate with the ends of said rods for maintaining said rods in predetermined positions on the section, resilient sleeve means substantially surrounding said perforated pipe section and said rods, and housing means substantially surrounding said sleeve means and cooperating therewith in sealed relation to provide a chamber into which other fluid under pressure is introduced for applying pressure to the outside of said resilient sleeve means.

2. A pulsation dampening device for use with a conduit carrying a fluid under variable pressure, comprising, in combination, a pipe section for connection to the conduit, said pipe section having a plurality of throttling orifices therein arranged in a plurality of rows extending substantially parallel to the longitudinal axis of the pipe section, a plurality of substantially semi-circular hollow rods disposed around the outside of said pipe section over said rows of orifices respectively, each of said rods having a plurality of transverse slots therein, a pair of caps fitted over the ends of said pipe section, each of said caps having a plurality of apertures therein for receiving the ends of said rods and maintaining said rods in position covering said rows of orifices on said pipe section, resilient sleeve means substantially surrounding said pipe section and said rods, and housing means surrounding said sleeve means and cooperating therewith in sealing relation to provide a chamber into which other fluid under pressure may be introduced for applying pressure to the outside of said resilient sleeve means.

3. Pulsation dampening apparatus for use with a pipe line carrying a fluid under variable pressure, comprising, in combination, a pipe section connecting to the line, a plurality of rows of throttling orifices in said section, a plurality of rods disposed on the outside of said section positioned over said rows of orifices respectively, each of said rods having slots therein communicating with said orifices, a pair of cups non-rotatably disposed at the ends of said pipe section, each of said cups adapted to receive the ends of said rods and to hold said rods in orifice covering relationship, resilient sleeve means substantially surrounding said section and rods, and housing means surrounding said sleeve means and cooperating therewith in sealed relation to provide a fluid tight chamber.

4. A mandrel for use in fluid pulsation dampening apparatus of the type in which resilient sleeve means at least partially encloses mandrel; said mandrel including a perforated pipe section having therein a plurality of rows of throttling orifices, a plurality of rods disposed on the outside of said pipe section over said rows of orifices respectively, said rods having transverse slots therein communicating with said orifices, and a pair of cups disposed on the ends of said pipe sections, said cups retaining said rods in covering position over said orifices.

References Cited in the file of this patent

UNITED STATES PATENTS

| | | |
|---|---|---|
| 2,497,020 | Singer | Feb. 7, 1950 |
| 2,583,231 | Ragland | Jan. 22, 1952 |
| 2,712,831 | Day | July 12, 1955 |

FOREIGN PATENTS

| | | |
|---|---|---|
| 598,012 | Great Britain | Feb. 9, 1948 |